United States Patent [19]

Gavrila

[11] Patent Number: 4,905,727
[45] Date of Patent: Mar. 6, 1990

[54] NON-FLOWING MODULATING PILOT OPERATED RELIEF VALVE

[75] Inventor: Gelu N. Gavrila, Parsippany, N.J.

[73] Assignee: Teledyne Industries, Inc., Los Angeles, Calif.

[21] Appl. No.: 292,558

[22] Filed: Dec. 30, 1988

[51] Int. Cl.$^4$ ............................................. G05D 16/00
[52] U.S. Cl. ................................. 137/488; 137/492.5
[58] Field of Search .................. 137/488, 86, 489, 492, 137/492.5

[56] References Cited

U.S. PATENT DOCUMENTS

| | | |
|---|---|---|
| 2,714,895 | 8/1955 | Rockwell . |
| 3,221,765 | 12/1965 | Farris . |
| 4,040,445 | 8/1977 | McCormick . |
| 4,172,466 | 10/1979 | Pattarini et al. . |
| 4,200,116 | 4/1980 | Gemignani . |
| 4,410,005 | 10/1983 | Reip ..................................... 137/488 |
| 4,458,716 | 7/1984 | Danre . |
| 4,519,416 | 5/1985 | Chaouloff et al. . |
| 4,615,356 | 10/1986 | Reip . |
| 4,648,553 | 3/1987 | Muller . |

*Primary Examiner*—Alan Cohan
*Attorney, Agent, or Firm*—Beveridge, DeGrandi & Weilacher

[57] ABSTRACT

A pilot operated relief valve which includes a non-flowing modulated pilot valve and a main valve. The pilot utilizes a torsion device in connection with transducers and valves. The transducers relate variations in pressure within the valve system to the torsion device. The torsion device, in turn, acts to open and close various ports of the pilot valve so as to achieve modulated relief of overpressurized fluid from a pressure system. In addition, the torsion device can be manipulated to provide for easily achieved and accurate set pressure positions.

29 Claims, 15 Drawing Sheets

NON-FLOWING MODULATING PILOT OPERATED RELIEF VALVE

FIELD OF THE INVENTION

This invention relates to a relief system for relieving excess pressure from fluid pressurized systems. More particularly, the invention features an improved pilot operating relief valve having a non-flowing modulating pilot and a main valve.

BACKGROUND OF THE INVENTION

A conventional pressure relief valve in its simplest form typically includes a valve seated by an adjustable compression spring against the force of the fluid pressure of the system it protects. More sophisticated designs include internal mechanisms which require adjustment when the system fluid is changed. However, when adjusted for one fluid, such valves tend to become unstable when called on to handle another. In addition, repeat accuracy of the set or blow-off point is difficult to achieve in large spring-loaded valves because of non-uniform heating of the large, set-pressure adjustment spring. To confront many of the problems associated with self-activated spring loaded pressure relief valves, various pressure operated relief valves were developed. Pressure operated relief valves include a pilot valve acting in associated with a main valve. Generally, pilot operated relief valves allow for superior quality in control parameters such as leak tightness, flow characteristics and stability.

Snap acting (popping) flowing spring-loaded valves were some of the first pilots used in conjunction with main valves. These pilots were generally utilized with main valves having a linear piston within a cylinder. Thereafter, the concept of providing modulation or proportional behavior in the pilot to prevent excessive amounts of product discharge captivated the field of research and design. It was apparent, however, that these latter concepts presented insurmountable exploitation problems due to flow through the pilot during main valve discharge and the resultant failure of the pilot caused by contact with the industrial fluids and associated impurities. In light of these failures in the pilots, it became apparent that non-flowing pilots would be needed to avoid contamination by the industrial fluids flowing the pilots.

Various pilot operated relief valves using non-flowing pilots have been developed which utilize diaphragms as sensors, an axial displacement design, soft seated pilot valves and often external tubing to interconnect the pilot to the main valve. Such devices, although avoiding many of the problems associated with pressure operated relief valves which allowed for fluid flow in the pilot, present problems in areas such as stability, adaptability to new and old systems, field service, long and short term reliability, efficiency, ease in adjustment, etc. These problems can be said to be due, to some extent, to the relatively complicated designs associated with these pilot operated relief valves.

SUMMARY OF THE INVENTION

The present invention provides a design which confronts the problems associated with the prior art pilot operated relief valves and, in so doing, presents a pressure relief system which, among other, is stable, easily adapted to both new and old systems, easy to service in the field, reliable, efficient, durable, relatively inexpensive, and easy to adjust for different set pressures. These advantages are due, in part, to the relatively simplistic approach made available by thorough research into the interrelated characteristics of static and dynamic fluid flow, pressure, and temperature within a system relying on pilot operated relief valve.

In the first embodiment of the invention, a pilot operated relief valve comprises a four-stage non-flow pilot valve and a main valve which, together, act to prevent damage to a vessel due to excessive pressure. The four-stage pilot valve has a vertical torsion bar which is integrally connected to a vertical cylindrical support. The torsion bar provides a set pressure adjusting device which can be easily adjusted to meet pressure requirements of the pressure vessel. Extending horizontally off the cylindrical support is both a lever and a follower bar. Each end of the lever is connected to a respective pressure sensor (e.g., bellows) which act as transducers to transform pressure variations into a linear displacement of the lever. The follower bar is adapted to pivot about a vertical axis and either open or close an inlet valve and an adjacent vent valve. The transducers are positioned on opposite sides of the lever and arranged such that rotation of the cylindrical support and attached torsion bar results in an equal displacement of each pressure sensor.

The follower bar and lever lie in separate chambers sealed off from one another by an O-ring positioned between the cylindrical support and a bearing surface forming part of the pilot valve housing. The two chambers remain sealed from one another, except in emergency situations whereupon a preventive disc ruptures when a certain pressure is exceeded and fluid pressure is relieved to the atmosphere through a hole in one of the chambers.

In operation, the torsion bar is set at an initial torque value which places the lever and follower bar in the "set" positioned designated A. In position A, the disc of the main valve is biased to its closed position by a spring. In addition, the lever is an abutment with a torsion stop and the follower bar is positioned such that the vent valve is firmly shut while the inlet valve is open.

A common pressure communication line exists between the pressure vessel, inlet valve and one of the two pressure transducers. Moreover, a pressure communication line extends between the valve chamber in which the follower bar rotates and the other of the two pressure transducers. The pilot valve chamber is in communication with the main valve cylinder containing the disc which covers the pressure vessel outlet.

Hence, as the pressure in the vessel begins to rise, the pressure sensors will transduce the rise into movement of both the lever and the follower bar in a direction against the initial torque rotation. At some point, the rotation lever and follower bar reach a neutral position. In the neutral position, both the vent valve and the inlet valve are closed and the main disc retains a sealing relationship with the pressure vessel.

A further increase in vessel pressure causes the lever and follower bar to rotate even further away from the original pre torque position. This movement opens the vent valve and firmly closes the inlet valve which results in the relief of pressure in both the pilot valve chamber and interconnected main valve cylinder. A relief of pressure in the main valve cylinder (i.e., dome pressure) enables the pressure in the vessel to raise the main disc such that pressure in the vessel escapes out an exhaust conduit. In the initial stages of pressure increase within the vessel, the invention provides for a modulating operation mode wherein the opening of the main valve is proportional to the amount of overpressure. The modulating operation mode ceases when the forces acting to raise the main valve disc completely overcome the opposing forces created by the dome pressure and a biasing spring. Relief of the pressure in the vessel eventually allows for the dome pressure and spring actuated main valve disc to move back into vessel sealing position and the follower bar and lever to move into the set position.

In a second embodiment of the invention, rather than a rigid follower bar with elastic pilot valve covers, an elastic blade having each of its ends connected to the pilot housing is utilized.

In a third embodiment of the invention, the torsion bar of the first embodiment is replaced with an elastic non-symmetric follower having blades with different modules of elasticity. This version also has means for changing the length and the boundary conditions of the elastic blades to permit torque adjustments.

The fourth embodiment of the invention is a compressed version of the first embodiment. In this embodiment, the torsion bar of the first embodiment is replaced with non-symmetrical elastic blades which are like those of the third embodiment. The elastic blades are attached to a central cylinder and the central cylinder has a disc attached to its upper end. Attached to the disc are a pair of diametrically opposed transducers.

Other features and advantages of the invention will become apparent upon reference to the following description of the preferred embodiments of the drawings.

DESCRIPTION OF THE PREFERRED EMBODIMENTS

Figure 1:
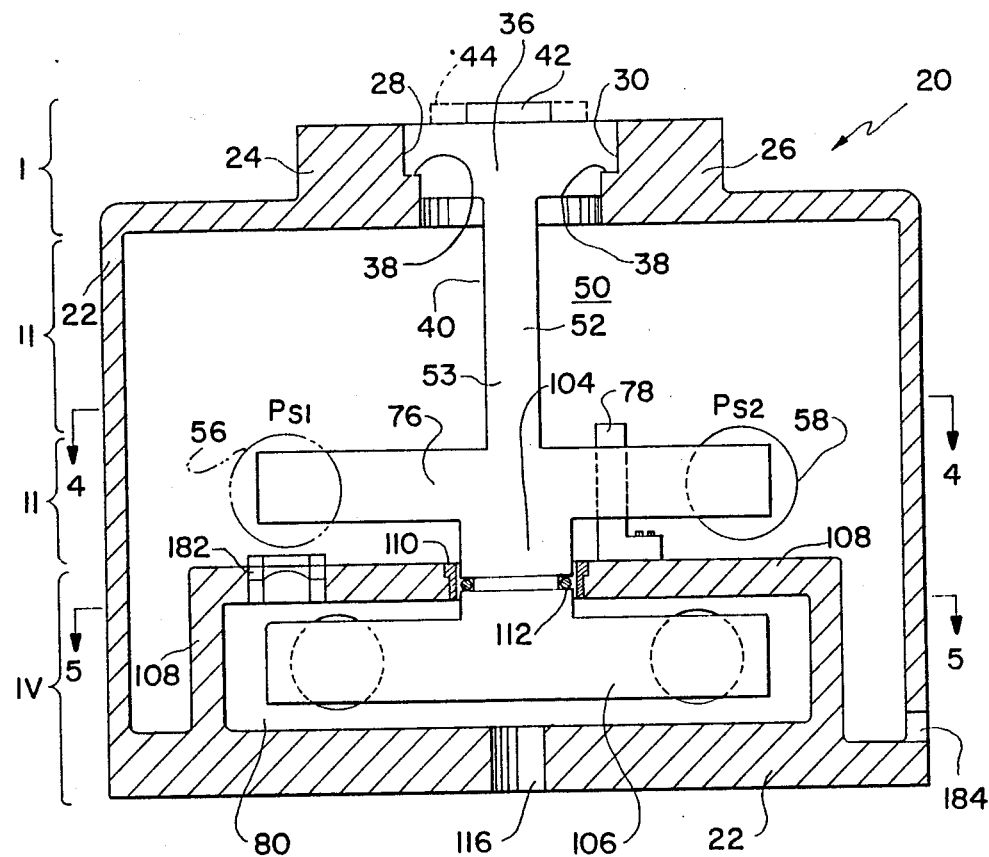
FIG. 1 illustrates in vertical cross-section a first embodiment of a non-flowing modulating pilot of the present invention.
Figure 3:
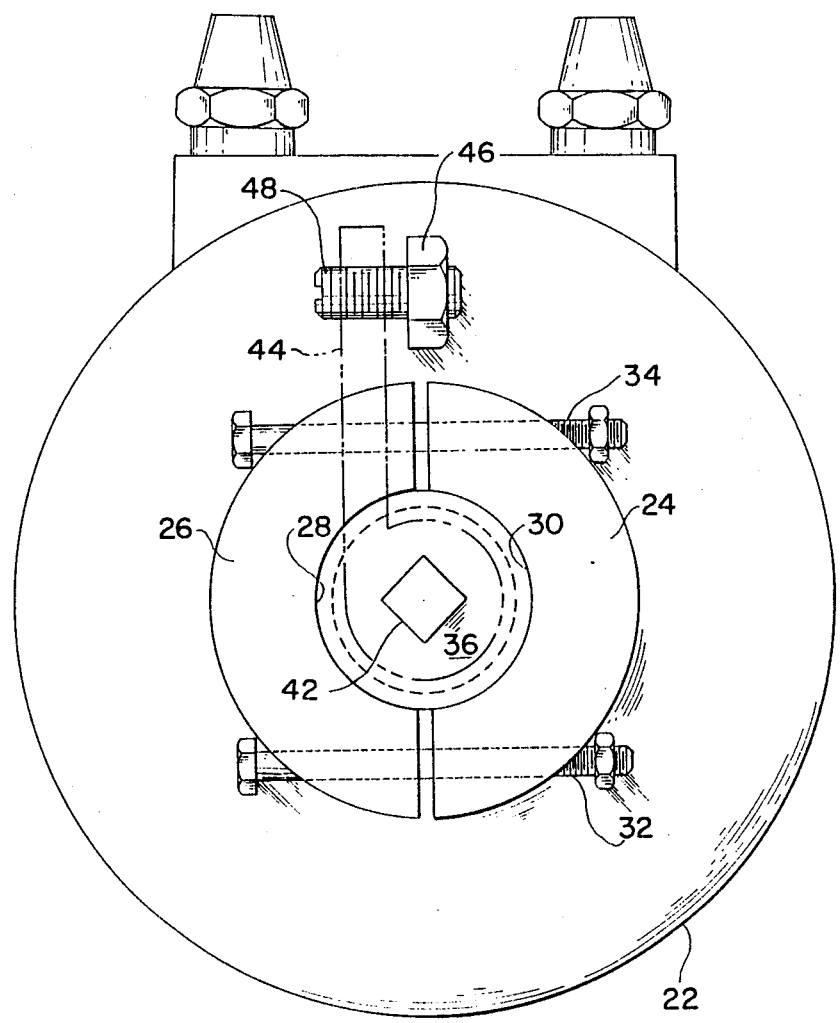
FIG. 3 illustrates in plan the embodiment of FIG. 1.

FIG. 1 shows in vertical cross-section a first embodiment of non-flowing modulating pilot 20 which is illustrated as having four stages (I to IV). First stage I, as best illustrated in FIG. 1 and FIG. 3, includes an upper region of pilot housing 22 having two clamping halves 24, 26. As illustrated in FIG. 3, clamping halves 24, 26 each include interior clamping surfaces 28, 30 which can be brought closer together by adjustment means such as a pair of threaded bolts (32, 34).

Interior surfaces 28, 30 are preferably concave in shape although other configurations are possible. A torsion bar retainer 36 is positioned between the adjustable clamping halves 24, 26 in either a rigidly fixed state or an adjustable state depending upon the position of adjustment means 32, 34. Retainer 36 is supported on shoulders 38 which form part of interior surfaces 28, 30. Shoulders 38 thus provide support for the entire torsion device 40.

Affixed to the upper end of torsion bar 36 retainer is attachment means 42 having a shape suitable for attachment with attachment device 44 shown in dashed lines in FIGS. 1 and 3. Extending off of the upper region of housing 22 is ear 46 (FIG. 3) with a threaded hole for receiving threaded rod 48. A threaded hole is also formed at the end of attachment device 44. When clamping halves 24, 26 are not in a compressive state about torsion bar retainer 36, attachment device 44 can be adjusted by rotation of threaded rod 48 to various positions which, as will be explained more fully hereafter, allows one to easily establish a set pressure for the system being regulated by pilot 20. Once the torsion retainer 36 is in a desired position clamping halves 24, 26 are brought closer together by adjustment means 32, 34 and torsion retainer 36 is locked into position by friction. Upon locking torsion retainer 36 in position attachment device 44 and rod 48 can be detached until further use is desired.

Figure 7:
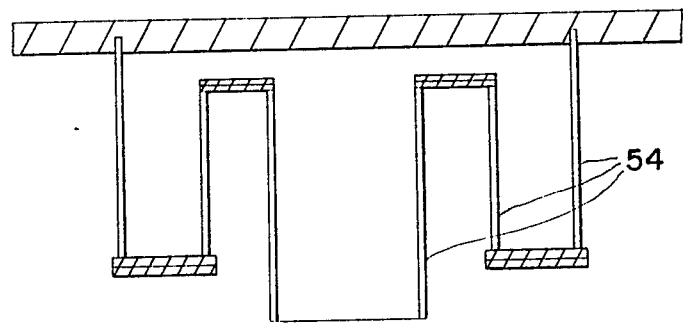
FIG. 7 illustrates in cut-away a variant of the torsion bar in the embodiment of FIG. 1.

The second stage of pilot 20 includes the upper region of chamber 50 and torsion bar 52 which extends off of retainer 36. Torsion bar 52 is dimensioned in accordance with the various requirements which will be expected of pilot 20. In a preferred embodiment torsion bar 52 includes an upper region 53 which is circular in cross-section and a diameter of about 0.06 to 2.4 inches. In FIG. 7 there is shown a compacted variant of torsion device 40 that includes a plurality of torsion rods 54 each interconnected and positioned to one side of the other. In addition to being interconnected to each other, each torsion rod is secured at one end to a rigid top container. Preferably chamber 50, within which torsion device 40 extends, is maintained at atmospheric pressure.

Figure 4:
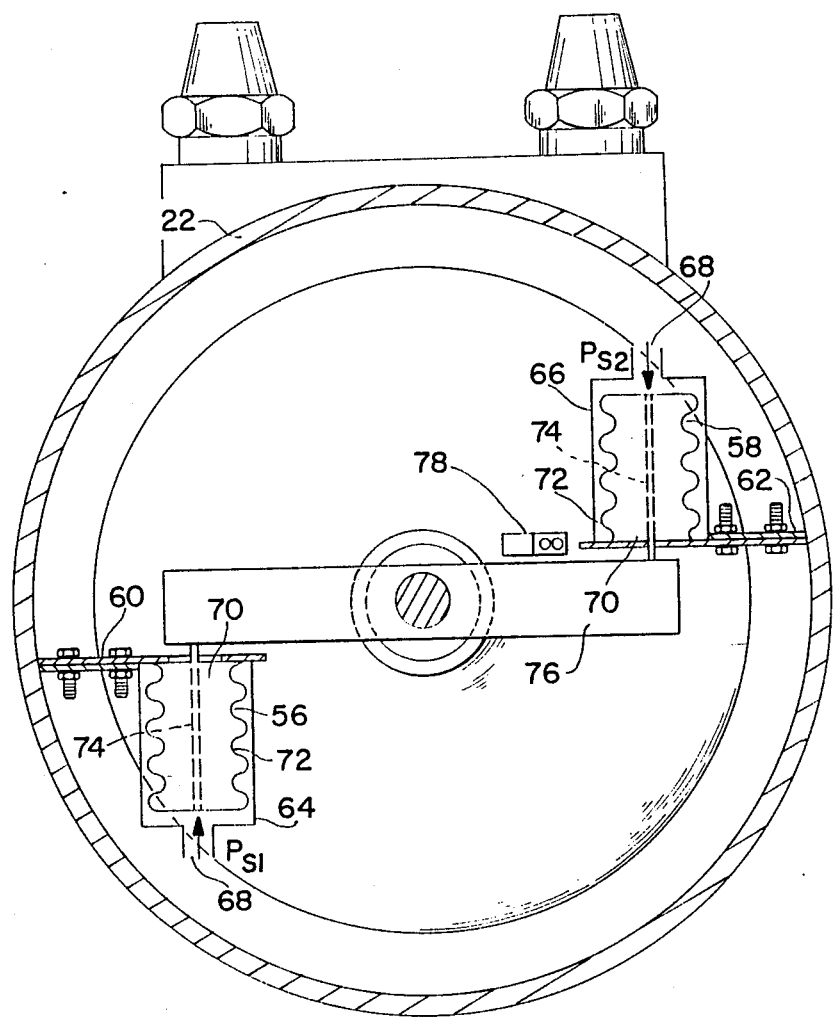
FIG. 4 illustrates in cross-section the interior of the pilot sensor stage of the embodiment of FIG. 1.

Stage III represents the sensor stage of pilot 20 wherein a pair of transducers 56, 58 are secured within housing 22. As illustrated in FIGS. 1 and 4, transducers 56, 58 are preferably of a bellows type. In FIG. 4, transducers 56, 58 are supported by respective supports 60, 62 each extending off of housing 22. Secured to supports 60, 62 are casings 64, 66 each including a fluid opening 68 and a linking opening 70. Within each casing 64, 66 is secured a flexible bellows member 72 attached to linking member 74. Bellows members 72 are preferably formed of stainless steel which ensures a long useful life for transducers 56, 58. Each linking member 74 is secured to lever 76 formed integrally with, or rigidly secured to, torsion bar 52. Linking members 74 are secured to lever 76 at opposite ends and on opposite sides such that both transducers act in tandem to rotate torsion bar 52 in a direction away from the original preset position of torsion bar 52. To prevent damage to bellows members 72 and to help in creating the initial torque in torsion bar 52, mechanical stop 78 is positioned to abut lever 76 upon reaching a predetermined amount of rotation. Stop 78 is rigidly secured to housing 22.

Figure 6:
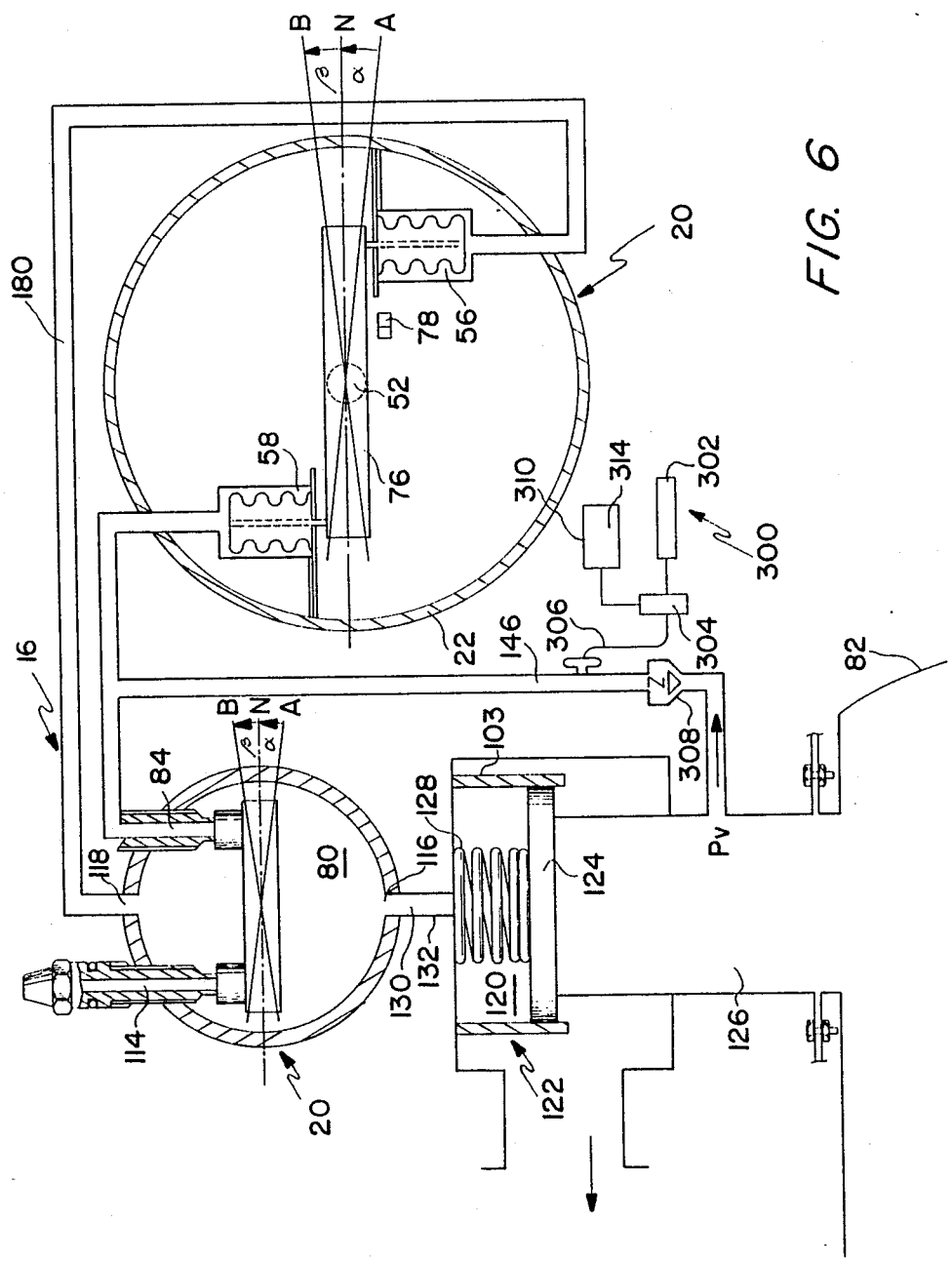
FIG. 6 illustrates schematically the piping scheme and main valve for the pilot operated relief valve in the present invention.

Transducers 56, 58 translate pressure into force and linear displacement. Fluid opening 68 in casing 64 of transducer 56 is in communication with valve chamber 80 (FIG. 6). In addition, transducer 58 is in communication with pressure vessel 82 (FIG. 6) and inlet port 84.

Figure 4A:
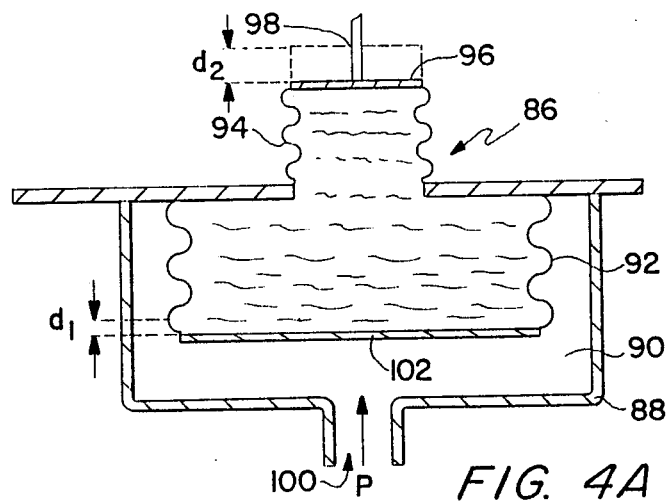
FIG. 4A illustrates a variant of the transducer featured in the embodiment of FIG. 1.

FIG. 4A illustrates an amplifying bellows transducer 86 which represents a contemplated variant for bellows type transducers 56, 58. Amplifying bellows transducer 86 includes casings 88 which are similar to those for transducers 56, 58. Within the interior 90 is a first bellow container 92 fluidly connected to a second and smaller bellows chamber 94. Covering bellows chamber 84 is a cap 96 which provides a location to which linking device 98 may attach and a seal for the liquid. The structural arrangement of transducer 86 acts to amplify any pressure variations in the fluid entering opening 100. Hence, when a rise in fluid pressure occurs in the fluid entering opening 100, cap 102 is caused to move away from the fluid source a distance d1 and the pressurization of fluid in chambers 92 and 94 results in cap 96 moving a distance d2. The amplifying effect can thus be stated as the value of d2/d1.

Figure 4B:
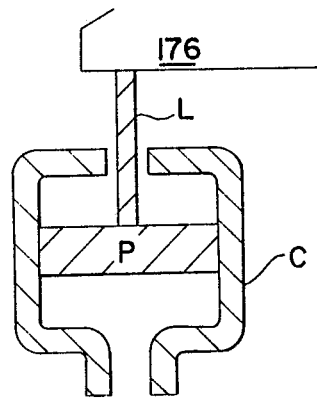
FIG. 4B illustrates another variant of the transducer featured in the embodiment of FIG. 1.

FIG. 4B illustrates a high pressure variant of the transducers shown in FIG. 1. In FIG. 4B, piston P slides within cylinder C and is connected to linking arm L which, in turn, is connected to lever 76.

Figure 4C:
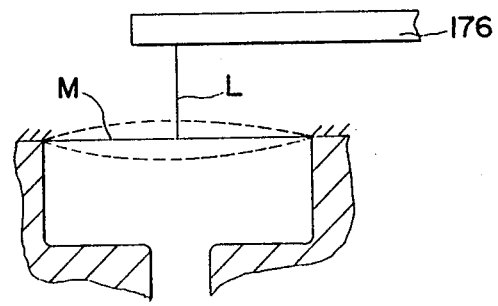
FIG. 4C illustrates another variant of the transducer featured in the embodiment of FIG. 1.

FIG. 4C illustrates a cost effective variant of the transducers shown in FIG. 1. In FIG. 4C membrane M deflects pressure dependent and is connected to linking arm L which, in turn, is connected to lever 76.

Figure 5:
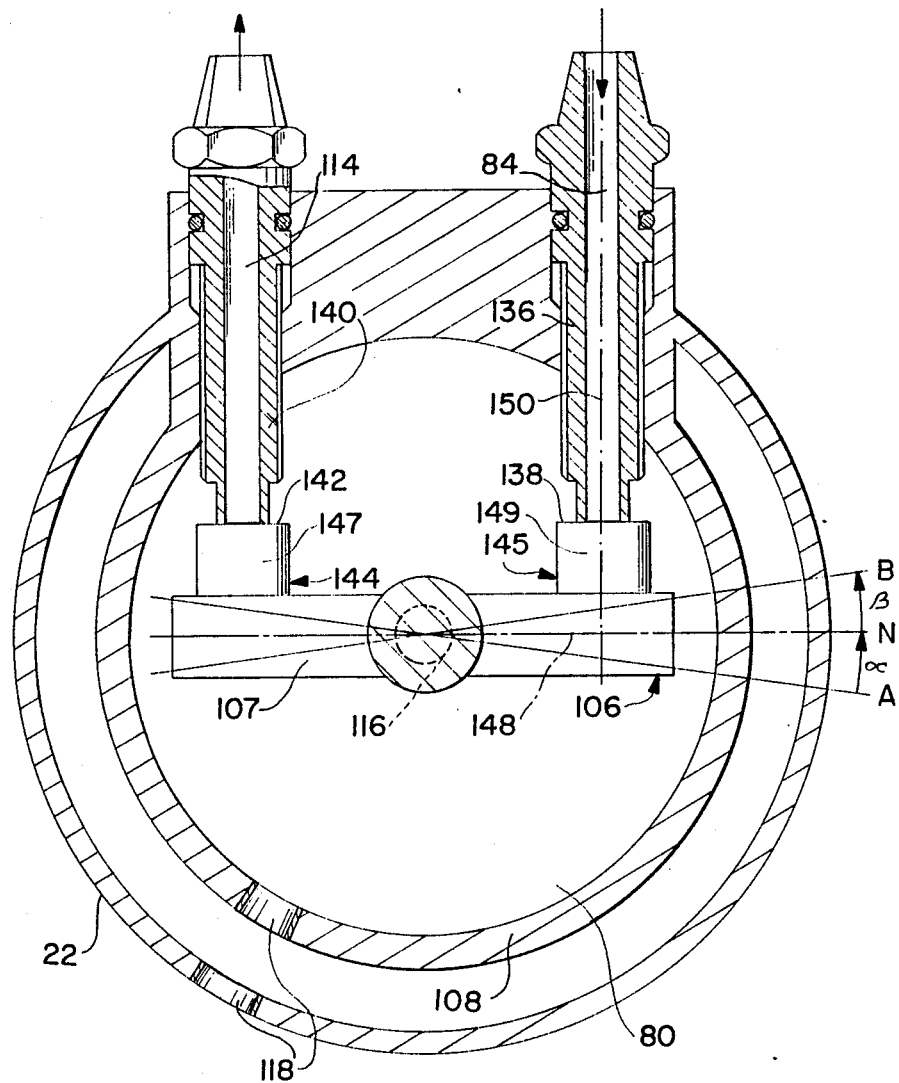
FIG. 5 illustrates in cross-section the pressure chamber of the embodiment of FIG. 1.

The fourth stage IV as shown in FIGS. 1 and 5, includes valve chamber 80 into which enlarged section 104 of torsion bar 52 extends. Integrally formed with enlarged section 104 and fixedly secured thereto is follower 106. Housing 22 of pilot 20 includes flanged sections 108 which act together to define a portion of valve chamber 80. Flanged sections 108 include bearing members 110 providing a low friction area in which enlarged section 104 rotates. Enalrges section 104 also includes a recess for receipt of O-ring 112 so as to preclude fluid flow or leakage from valve chamber 80 into chamber 50. This arrangement enables follower 106 to rotate within valve chamber in accordance with rotation of torsion bar 52 and lever 76. Additionally, bearing members 110 prevent the occurrence of large frictional forces between enlarged section 104 and flanged sections 108 in the event that out of horizontal plane force components (producing torque) might occur.

As best illustrated in FIGS. 1, 5 and 6, the portion of housing 22 which defines valve chamber 80 includes inlet port 84, vent port 114, communication port 116, and communication port 118. Inlet port 84 is in communication with both pressure vessel 82 and transducer 58. Vent port 114 opens to the atmosphere or a large volume chamber (not shown) so as to allow, in appropriate circumstances, pressure relief in valve chamber 80. Communication port 116 is in communication with dome pressure chamber 120 defined by main cylinder 103 of main valve 122. Slidably confined within main cylinder 103 is disc (or piston) 124 which covers an outlet nozzle 126 of pressure vessel 82 to form a piston-covers-nozzle type of main valve. Disc 124 is biased by spring 128 and any fluid pressure within dome pressure chamber 120. Piping line 130 extends between communication port 116 and main cylinder 103 and includes partial blockage means 132 to provide a damping function.

Inlet port 84 includes inlet valve nozzle 136 which is threadably received within inlet port 84 so as to allow for an adjustment of the degree to which nozzle end 138 extends into valve chamber 80. Similarly, vent valve nozzle 140 is threadably received within vent port 114 and nozzle end 142 can be varied in position. In addition, sealing rings 142 are provided to prevent leakage between nozzles 136, 140 and the port into which they are threaded.

FIG. 5 shows covering means 144, 145 comprising elastic pads 147, 149 arranged on a common side and at opposite ends of follower 106 so as to be in position to cover nozzle ends 138, 142. Pads 147, 149 may be formed of a material such as rubber or plastics which has proven to provide adequate sealing functions over long periods of time. When follower 106 is in the position denoted N, both inlet and vent valve nozzles 136, 140 are closed and leaktight due to elastic pads 144, 145 being partially compressed over ends 138, 140. The position indicated as N represents a neutral position for follower 106. Two other extreme positions A and B are also shown in FIG. 5. Position A represents a position wherein follower 106 is rotated towards vent valve nozzle 140 and away from inlet valve nozzle 136. This allows the fluid pressure of vessel 82 to enter into valve chamber 80 through line 146 (FIG. 6).

Position B represents a position in which elastic pad 145 is highly compressed over nozzle end 138 and elastic pad 144 no longer covers nozzle end 142 such that pressurized fluid in chamber 80 is released to the atmosphere through vent valve nozzle 140. In the embodiment shown in FIG. 5, center line 148 of follower 106, when in a neutral position, is at right angles to center line 150 of each of the nozzles 136, 140. If the situation warrants, however, center line 148 may form other than a right angle to center line 150.

Figure 2:
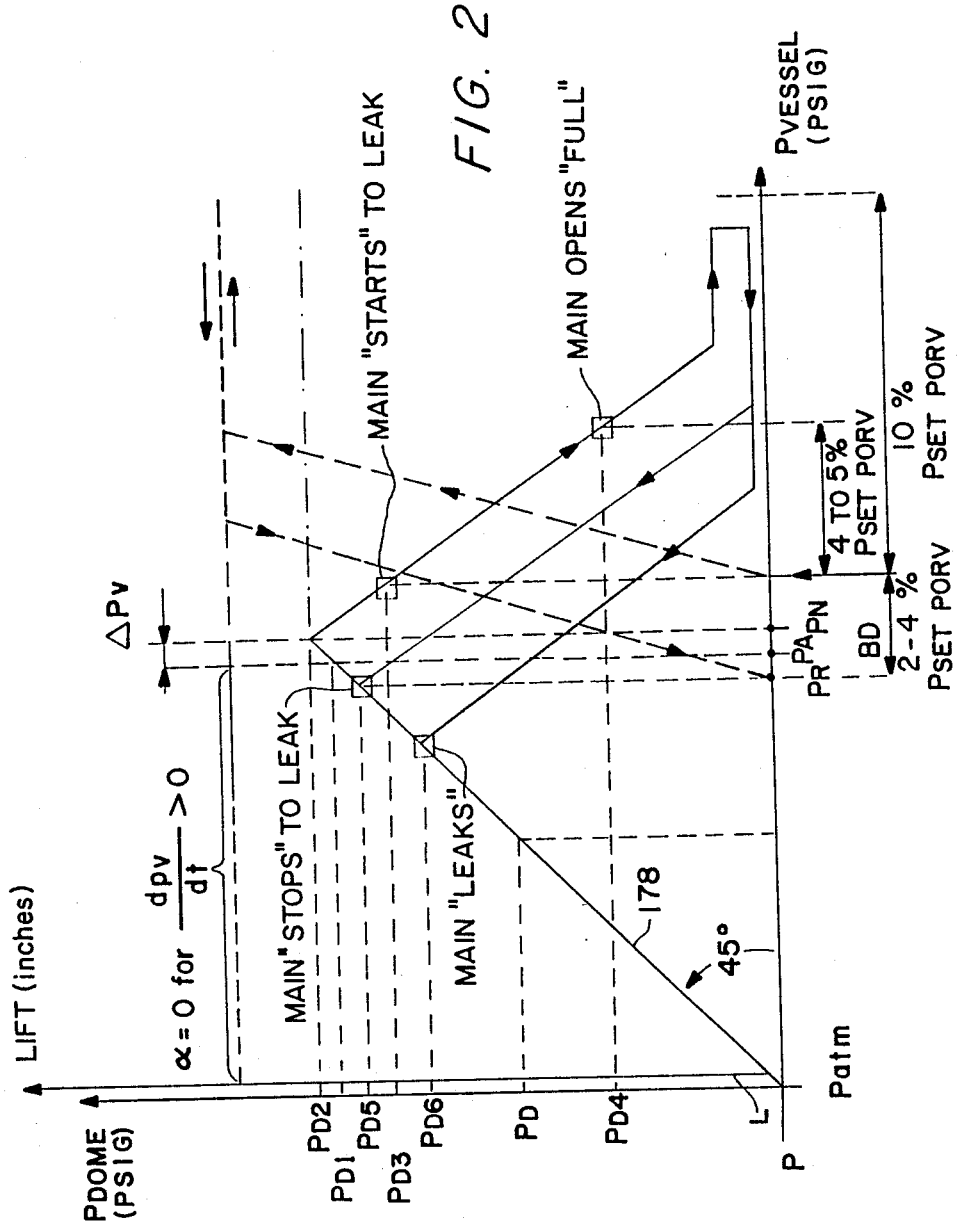
FIG. 2 illustrates a functional diagram with the dome pressure and lift along one axis and the pressure of the vessel along the other axis.
Figure 2A:
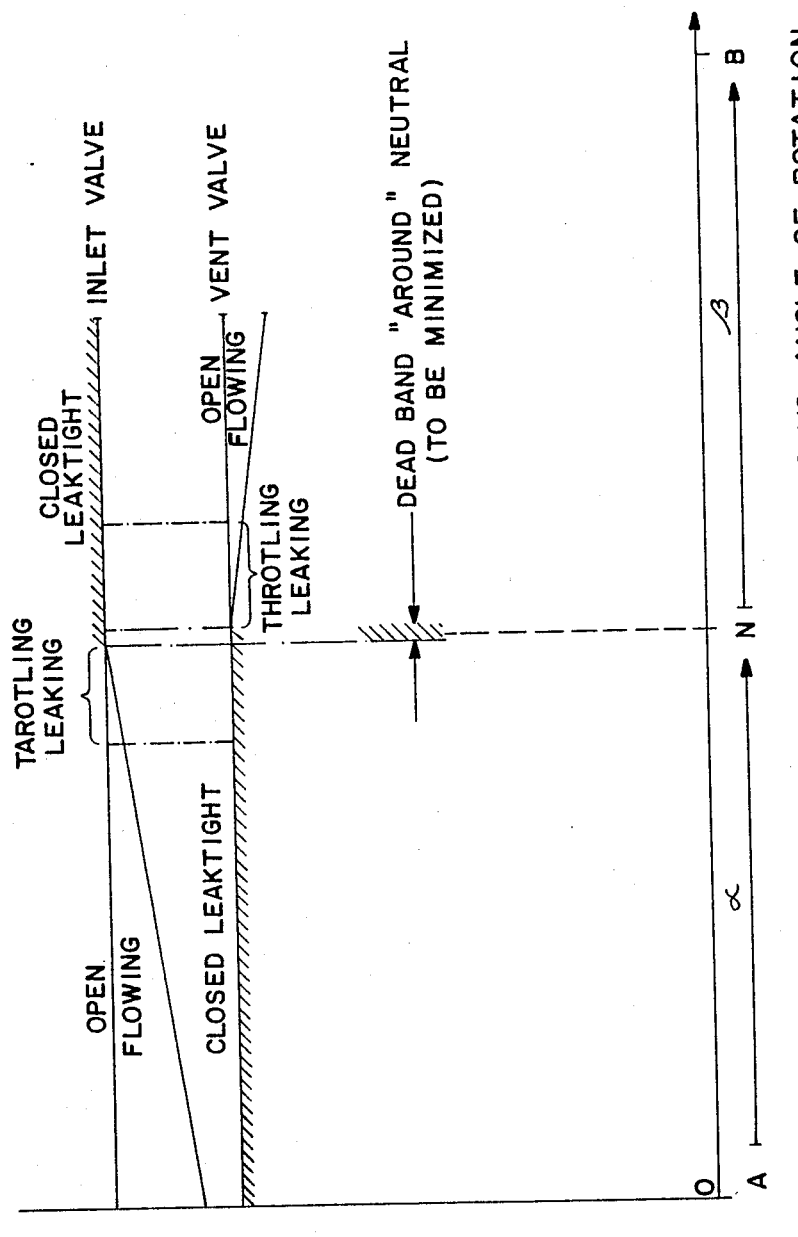
FIG. 2A illustrates graphically the inlet/outlet valve position in relation to the angle of rotation.

FIG. 2A represents graphically, the relationship between the condition of valves 136, 140 and the positioning of follower 106. As can be seen there exists periods when one of each of the valves is closed leaktight while the other is in a throttling-leakage position.

Figure 5A:
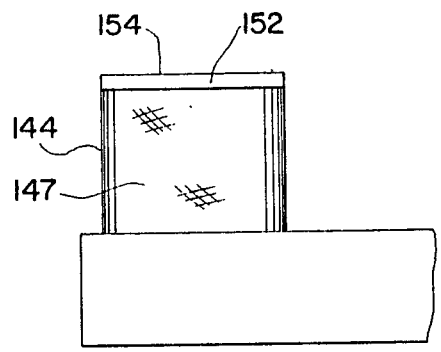
FIGS. 5A-G illustrate in cut-away variants the inlet and outlet closures featured in the embodiment of FIG. 1.

In FIG. 5A there is shown an alternate embodiment for covering means 144, 145 wherein elastic pads 147, 149 are covered with metal disc 152 which preferably includes lapped surface 154.

Figure 5B:
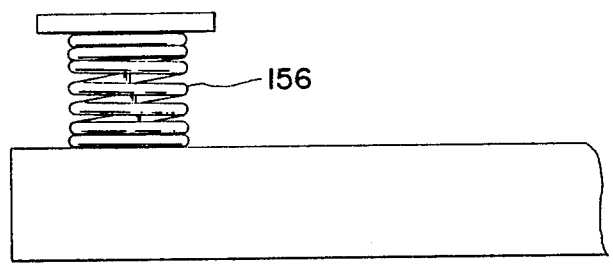
Figure 5C:
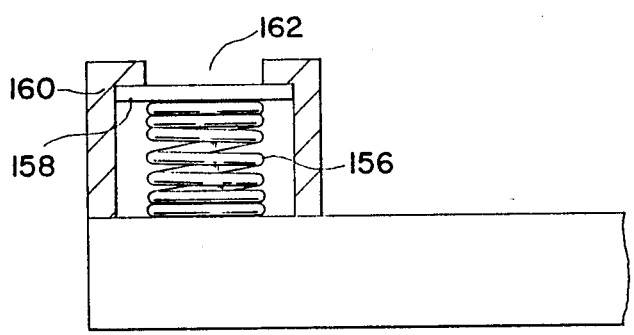

FIG. 5B shows another embodiment for covering means 144, 145 which includes spring 156 and attached lapped metal disc 158. FIG. 5C represents yet another embodiment of covering means similar to that of FIG. 5B except that spring 156 and disc 158 are confined within retainer 160 having an upper opening 162 smaller than the surface area of disc 158.

Figure 5D:
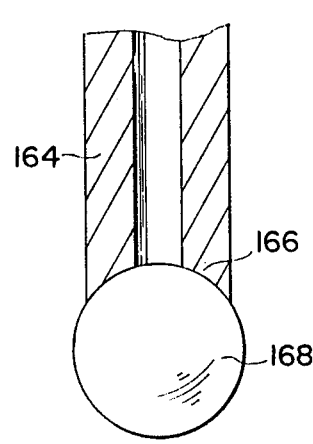
Figure 5E:
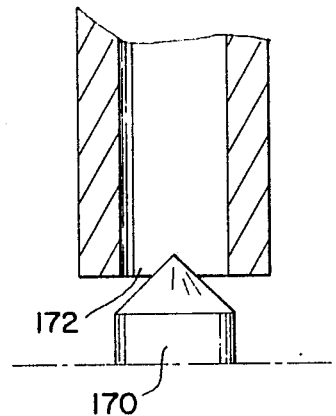

FIGS. 5D and 5E show still further embodiments of covering means 144, 145. The embodiment is shown in FIG. 5D includes nozzle 164 with concave end 166. Bearing ball 168 is connected to lever 106 and sized to be received within concave end 166 in a sealing fashion. FIG. 5E shows utilization of conical poppet 170 to provide a way to block nozzle end 172.

Figure 5F:
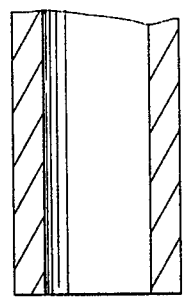
Figure 5G:
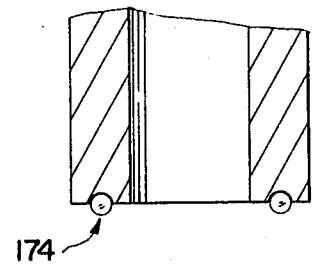

FIG. 5F shows a "soft" seated valve nozzle end 174 which includes an O-ring 176 fixedly received within a recess formed in nozzle end 174. The lever may include a raised surface to provide an appropriate sealing contact.

FIG. 2 illustrates graphically the modulation features of the present invention. In FIG. 2 the vertical axes represent the lift or clearance which disc 124 (FIG. 6) assumes with respect to the free edge of outlet nozzle 126 and the dome pressure chamber 120. The horizontal axis represents pressure within vessel 82. Further discussion of FIG. 2 will appear further in discussing the operation of the invention.

As previously noted, FIG. 6 illustrates the piping scheme of a preferred embodiment of the invention which relies on the four-stage pilot depicted in FIG. 1. Reference to FIG. 6, in particular, is made as the following explanation is given for the pressure operating relief valve 16 with its pilot component 20 and main valve component 122. Initially, torsion bar 52 is positioned, in the manner previously explained, to have locked in an initial torque value. The value of the initial torque is dependent upon the amount torsion bar 52 is rotated while in abutment with mechanical stop 78. As lever 76 is in abutment with mechanical stop 78, center line 148 of follower 106 (FIG. 5) is in position A. The initial states of the various components while the invention is in position A appear as follows.

(a) Main valve 122 is closed due to pressure in dome chamber 120 and the biasing force of spring 128 forcing disc 124 into contact with nozzle outlet 126.

(b) Vent valve nozzle 140 is closed and inlet valve nozzle 136 is open.

(c) Lever 76 is resting on mechanical stop 78 with the bellows of transducers 56, 58 in outstretched position.

(d) Torsion bar 52 is under initial (dialed or adjusted) torque.

(e) There exist atmospheric pressure throughout the system including pressure vessel 82.

When the pressure in vessel 82 rises to a level greater than atmospheric pressure but less than that required to cause transducer 58 to impart sufficient force to lever 76 to release 76 from its original position A (i.e. $P_V < P_A$), the fluid of vessel 82 remains in communication with valve chamber 80. In other words, fluid from pressure vessel 82 enters chamber 80 through line 146 due to inlet valve nozzle 136 being open. Because vent valve nozzle is closed at this stage dome pressure $P_D$ is essentially identical to vessel pressure $P_V$. FIG. 2, illustrates this graphically with 45° line 178. Dome pressure $P_D$ acts to further load spring pre-loaded disc 124 and the applied pressure (lines 146 and 180) on transducers 56 and 58 remains insufficient to create a torque in lever 76 which is sufficient to overcome the initial (set) torque valve. Hence, lever 76 remains in abutment with mechanical stop 78.

For further increasing vessel pressure ($P_A < P_V < P_N$) the torque created by the two transducers 56, 58 overcomes the initial (set) torque and rotates the lever and follower from A towards N. The contact between lever 76 and mechanical stop 78 is thus lost at this point.

Additionally, vent valve nozzle 140 remains closed (although the compression in elastic pad 147 decreases) and inlet valve nozzle 136 becomes covered With increasing vessel pressure, lever 76 eventually moves into the neutral or N position whereon both inlet and vent valve nozzles are in a closed state. Main valve 122 also remains in its closed position as the spring load and $P_D$ pressure act to keep cover 124 in contact with outlet nozzle 126. FIG. 2 shows, for this state of the system, $P_v = P_N$; $P_V = P_D$ and, concurrently, the lift vs. vessel pressure graphic in FIG. 2 (L Vs PV) which indicates zero lift (L=0).

For still further increasing vessel pressure ($P_N \geq P_V$), transducer 56, which is initially in a "locked" pressure $P_N$ state, senses the rise in pressure and subsequently acts to rotate both lever 76 and integrally attached follower 106 further away from neutral $P_N$. That is, the degree of rotation exceeds $\theta = \alpha$. At the time the pressure in the vessel is sufficient to cause lever 76 to rotate into position B ($\theta = \alpha + \beta$), inlet valve nozzle 136 remains closed while vent nozzle 140 opens. Consequently, the "locked in" fluid pressure within chamber 80, dome pressure chamber 120, line 180 and transducer 56 is released to the atmosphere. This discharge reduces the dome pressure $P_D$ such that the pressure acting upon transducer 56 is lowered allowing for rotation of lever 76 back towards the neutral position N.

In FIG. 2, it can be seen that for increasing vessel pressure a decreasing dome pressure (or negative slope line $P_D$ vs. $P_V$) is the resultant of the aforementioned "oscillations" of the lever and follower from neutral N to B and back to neutral N. Eventually, the equilibrium of forces acting on the main valve disc 124 vanishes and consequently disc 124 will move and the main valve 122 will start to open exhibiting a proportional lift L as shown in FIG. 2. This is the "modulating" operation mode of the main valve, meaning a proportional opening of the main (due to a dome pressure decrease) which in turn is proportional to the amount of overpressure.

The proportionality or modulating range is maximized in reference to the vessel pressure value at which the main starts to leak referred to in FIG. 2 as the set pressure of the P.O.R.V. ($P_S$). The modulating range (4 to 5% of $P_S$) ceases when the main valve disc impinging forces overcome, in totality, the opposing force created by the dome pressure $P_D$ and spring 128 causing disc 124 to lift off outlet nozzle 126 (lift $L \geq D/4$ with D representing the main nozzle diameter).

The main valve discharges product through the main valve outlet (see FIG. 6) and eventually the vessel pressure starts to decrease during the time. The main valve remains full open until the decreasing vessel pressure reaches a value low enough to cause transducer 58 to produce a torque which is insufficient to hold the follower 106 and lever 76 in the B position ($\theta = \alpha + \beta$). The torsion bar will thus return the lever 76 and follower 106 from position B (inlet closed, vent open, see FIG. 6) to position N - neutral (both valves closed). The main valve continues to discharge and thus to reduce the vessel pressure. The further reduced vessel pressure is sensed by transducer 58 and consequently the torsion bar initial torque moves the lever and follower from position N to A. The result is that the inlet valve opens, a quantity of fluid penetrates into the valve chamber, refilling it, but also increasing the pressure acting inside the dome and line common to transducer 56. This feedback returns the lever and follower back to N, thus creating an oscillatory motion N-A-N in the lever and follower (having a variable amplitude and frequency). This oscillatory motion N-A-N is the dynamic system response to the decreasing vessel pressure signal. The dome pressure $P_D$ increases in proportion with the decreasing vessel pressure. Eventually, the dome pressure $P_D$ and spring force will start to decrease the main valve lift L for decreasing vessel pressure.

FIG. 2 shows two branches X and Y of $P_D$ vs. $P_V$ during $dp_V/dt<0$ (decreasing pressure vessel). When the hysteresis is small, the branch X will intersect with the 45 degree $P_D=P_V$ characteristic and the dome pressure can be larger than the dome pressure existent when the main valve started to leak due to increasing vessel pressure. Thus, for a relatively small hysteresis the main valve recloses. If a wide hysteresis is designed (branch Y in FIG. 2) the main valve closes, but leaks if no supplementary device is used to decrease the vessel pressure FIG. 2 shows that if the vessel pressure does not increase beyond the 4 to 5% proportionality range, but the main valve intermediate opening reduces the vessel pressure, the operating point of the pilot can jump from the decreasing $P_D$ vs. $P_V$ characteristic to branch X. A sudden (step function) vessel pressure, which does not allow timewise the oscillations needed to decrease or increase the dome pressure, will open the main disc 124 to full lift and thus provide a "snap" action in the present invention.

FIG. 1 shows a miniature rupture disc 182 located in one of flanges 108 of housing 22. Under any circumstance should the vessel pressure rise above a predetermined value (e.g. 15%) of the set pressure, the rupture disc will rupture and discharge the dome content through hole 184 in chamber 50 causing the pilot operated relief valve to fail open.

Figure 8A:
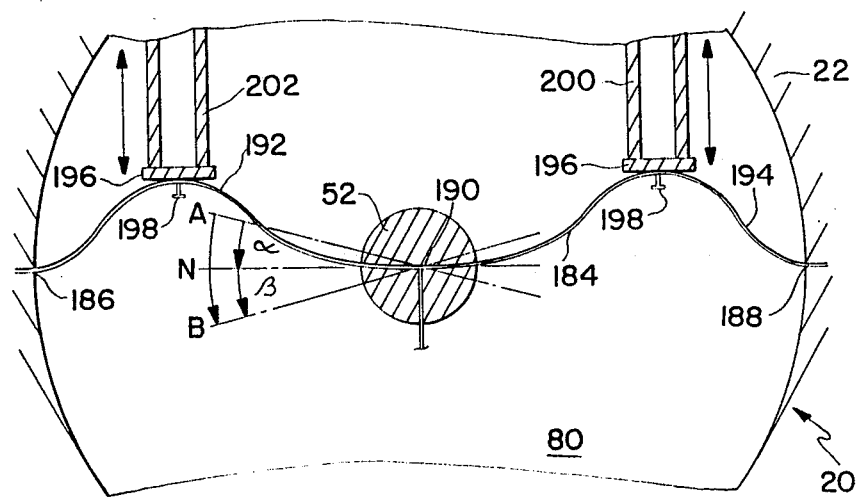
FIGS. 8A-C illustrate in cross-section a second embodiment of the non-flow modulating pilot valve in a variety of positions.
Figure 8B:
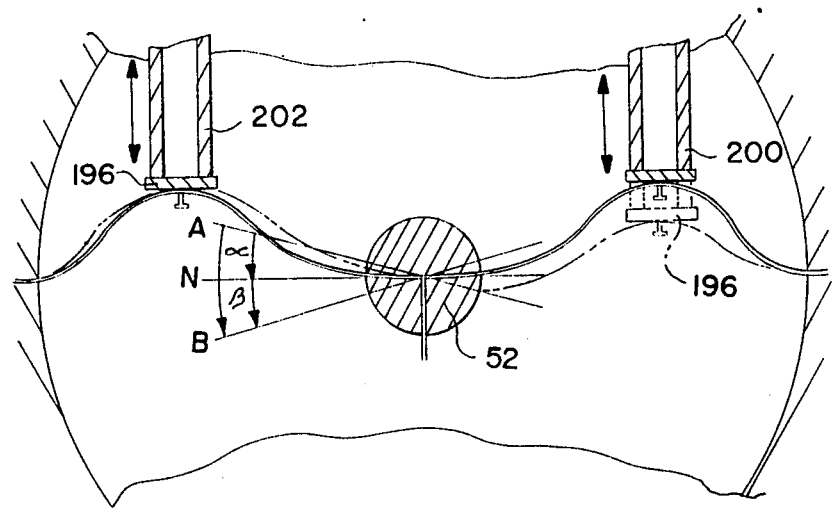
Figure 8C:
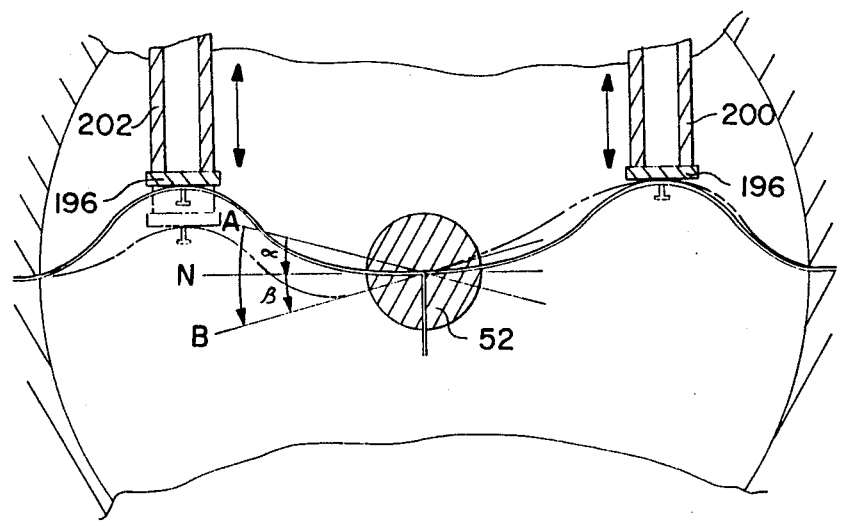

In the embodiment represented in FIG. 1, the follower 106 is shown to be rigid while covering means 144, 145 (FIG. 5) is depicted as being elastic in nature. FIGS. 8A-C represent another embodiment of the present invention wherein the entire fourth stage (IV, FIG. 1) of pilot 20 includes an elastic blade 184 which replaces the rigid follower bar 107 and attached elastic covering means 144, 145. FIG. 8A shows elastic blade 184 as being secured at ends 186, 188 to housing 22 of pilot 20. Blade 184 is preferably formed to have an essentially sinusoidal configuration. The mid-region 190 of blade 184 is releasably locked to the end of torsion bar 52 which is positioned within chamber 80. Blade 184 is preferably formed of carbon steel or berylium copper having a width of about 2 ¼" maximum and a thickness of about 0.300 in maximum.

Attached to the peak portions 194, 194 of sinusoidal shaped blade 184 are closing means 196 which are shown to be metal discs in FIGS. 8A-C. Closing means 196 are fixed to blade 184 by connectors 198 in a manner which allows for a limited degree of rocking motion.

FIG. 8A shows the fourth stage of pilot 20 in the neutral position N wherein both inlet valve nozzle 200 and vent valve nozzle 202 are closed.

FIG. 8B shows in dashed lines blade 184 in the configuration it assumes for position A. In position A inlet vent nozzle 200 is open and vent valve nozzle 202 is closed.

FIG. 8C shows in dashed lines blade 184 in the configuration it assumes for position B. In position B inlet vent nozzle 200 is closed and vent valve nozzle 202 is open.

The elasticity inherent over the length of blade 184 allows blade 184 to achieve the same kinematic functions (i.e. opening and closing of the inlet and vent valves) as was achieved by the combination of rigid follower bar 107 and elastic covering means 144, 145 in the first embodiment of FIG. 1.

The previous discussion for FIG. 1 indicates that the torsion bar functions to provide mechanical support for the additional components of torsion device 40 and a means to adjust for an initial torque valve.

Figure 9:
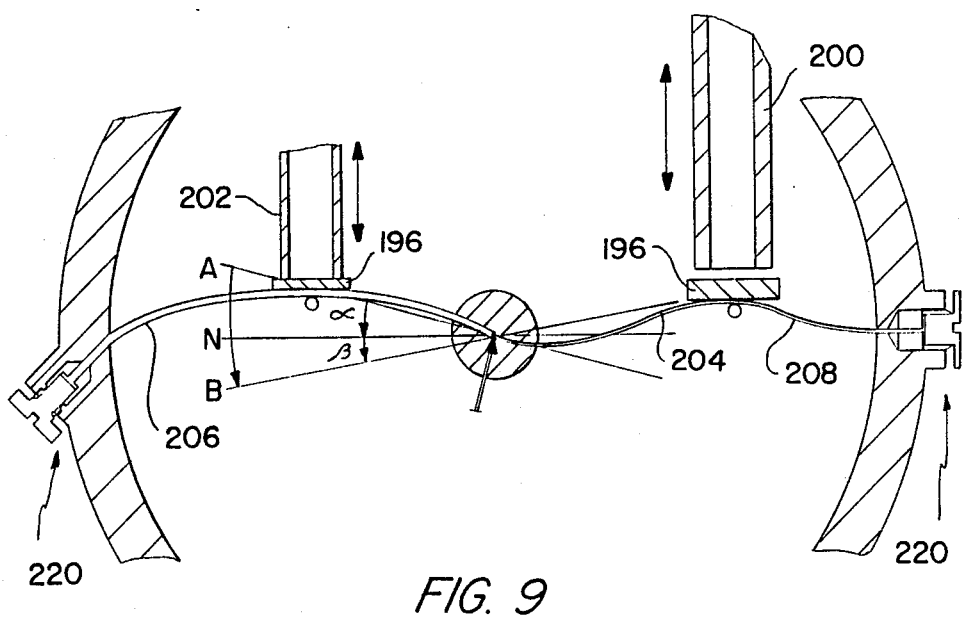
FIG. 9 illustrates in cross-section a third embodiment of the non-flow modulating pilot valve.
Figure 12:
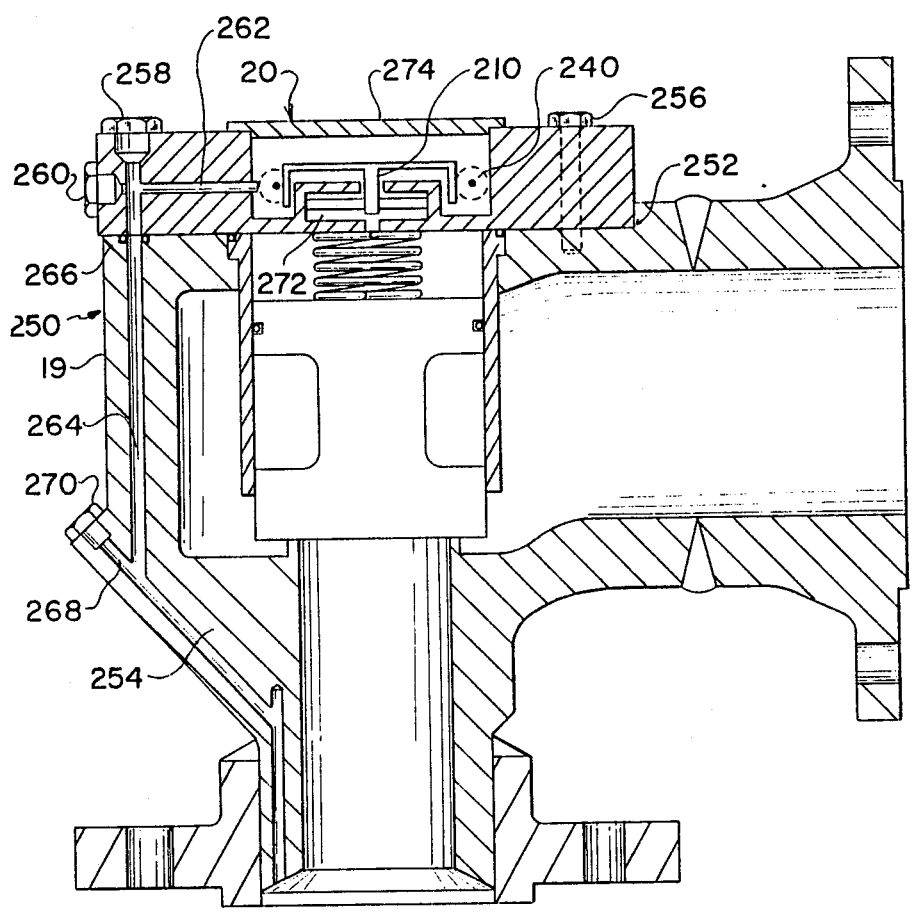
FIG. 12 illustrates in vertical cross-section the embodiment of FIG. 11 in position with a preferred embodiment of the main valve.

In another embodiment shown in FIG. 9, the role and function of torsion bar 52 is achieved by substituting, in place of torsion bar 52, non-symmetric follower 204. Non-symmetric follower 204 includes blade section 206 having a higher modulus of elasticity than blade section 208. Blade sections 206 and 208 are shown in FIG. 9 to be integral and attached to one end of intermediate member 210 (FIG. 12).

The non-symmetry in the blades provides a function similar to the placement of an initial torque in torsion bar 52 That is, the inlet valve is initially biased open (position A) and the vent valve closed. Rotation of intermediate member 210 results in movement of blade 204 into an inlet valve closing position. However, because blade 206 is not as easily flexed it remains in inlet valve closed position thus achieving position N with both the inlet and vent valve in closed position. When the pressure in the vessel is high enough, the additional stiffness of blade 206 is overcome an intermediate member 210 is rotated to a point where blade 206 is moved away from the vent valve closed position (i.e. position B).

A suitable material for blades 206 and 208 includes carbon steel. Moreover, to achieve the difference in stiffness values it is possible to use similar materials for both blade sections with one section having a different thickness. In a preferred embodiment, the carbon steel blade 206 has a thickness of about 0.200 of an inch and blade 208 has a thickness of about 0.07 of an inch. Various other arrangements to achieve the differences in elasticity are also possible including use of different materials.

Figure 10:
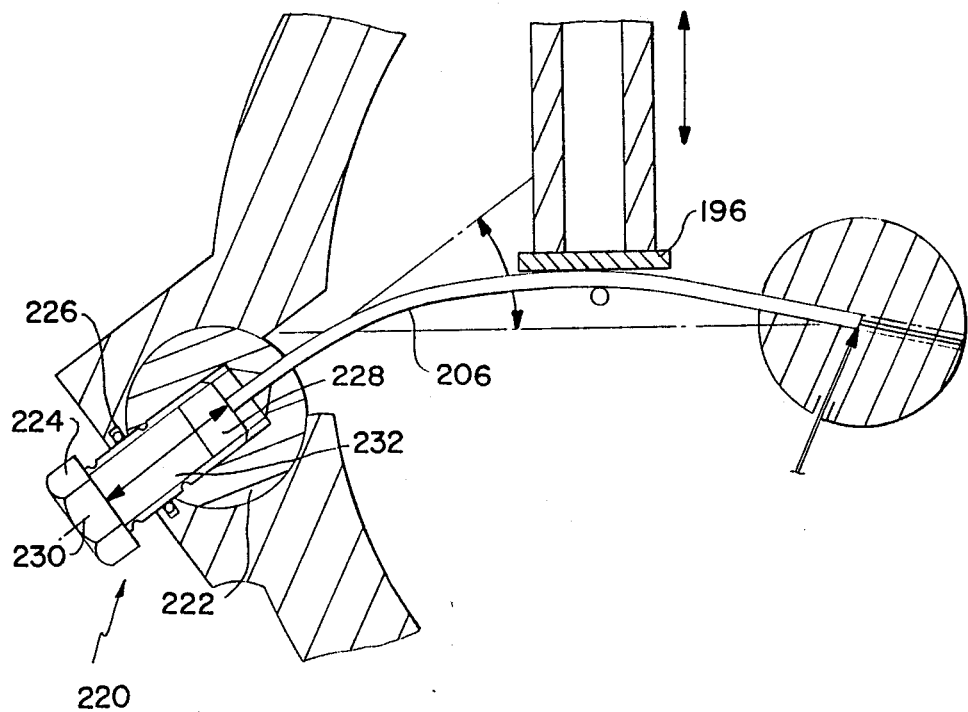
FIG. 10 illustrates an enlarged view of the adjustment means of the embodiment of FIG. 9.

FIG. 9 and, in more detail, FIG. 10 illustrate adjustment device 220 positioned within a thickened portion of housing 22. Adjustment device 220 includes half-split cylinder 222 and screw 224. Half-split cylinder 222 is rotatively secured within a recess in housing 22 and O-rings are provided in recess 226 to ensure no fluid leakage about adjustment screw 224. Screw 224 is threadably received within half split cylinder and includes rotating member 228. Blades 204, 206 push outwardly against rotating member 228. Rotating member 228 moves along the longitudinal axis 230 of screw 224 adjusting the length of the blades 204, 206. The half-split cylinder 222 is locked via a lock-nut similar to locking nut 238 shown in FIG. 11 to provide blades with adjustable cantilever angle $\gamma$. Adjustment device 220 provides a means for achieving the appropriate set pressure in the system. In other words, by changing the degree of curvature of each blades 204, 206 variations in the amount of torque required to move closing means into and out of position over respective nozzles 200, 202 are possible. Half-split cylinder 222 and adjustment device 220 allow for the end of each of blades 204, 206 to assume the necessary degree of initial curvature and initial adjustable torque.

Figure 11:
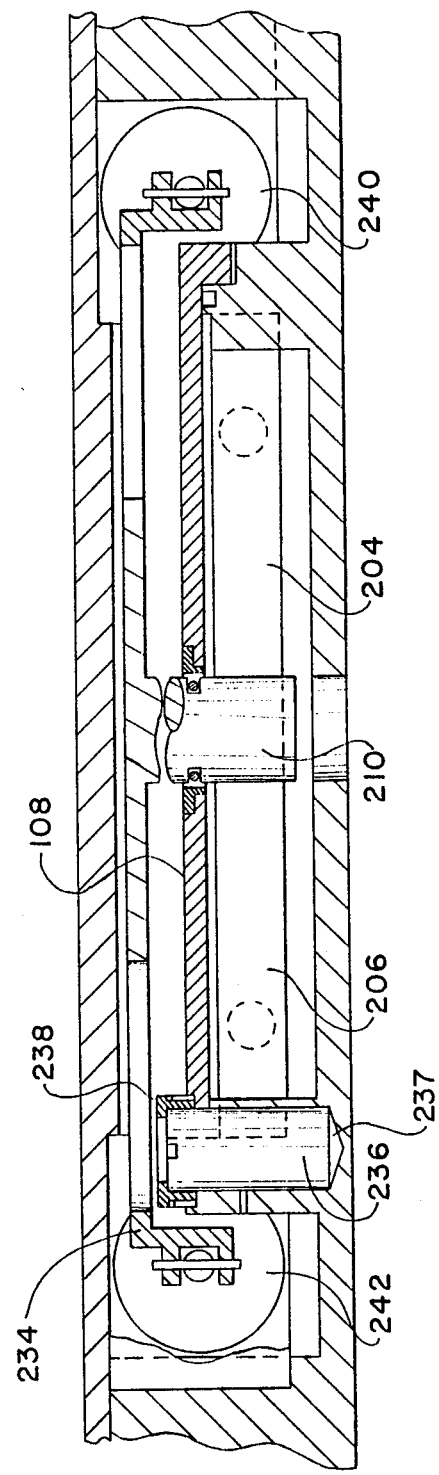
FIG. 11 illustrates in vertical cross-section a fourth embodiment of the non-flow modulating pilot valve.

FIG. 11 illustrates a compacted embodiment of the invention having only two stages as opposed to the four stages (I-IV) in FIG. 1. As illustrated in FIG. 12, this compactedness makes it possible to "sink" pilot 20 into main valve 19, thus allowing for use of the invention in positions heretobefore not possible giving a designer more freedom in designing piping systems and the like. The embodiment of FIG. 11 relies on non-symmetrical blades 204, 206 which, in addition to their biasing function provide support for intermediate member 210 and circular flat disc 234. Adjustment device 236 includes a rotating half-split cylinder 237 into which one end of blade 206 is secured. A lock-nut 238 is fixed to flange 180 and maintains half-split cylinder 237 in position. Variations in the curvature of blade 206 are thus made possible by rotating cylinder 237 and then locking it in position with lock-nut 238.

Transducers 240, 242 are connected to flat disc 234 and play the same role as the transducers for the previously discussed embodiments. The piping scheme is generally the same as that illustrated in FIG. 6.

FIG. 12 show pilot operated relief valve 250 having pilot 20 sunk into reception area 252 of casing 254. Housing 256 of pilot 20 includes 258, 260 plugging conduit 262. Additional conduit 264 is formed within casing 254 and arranged so as to align with conduit 262. O-rings 266 ensure that leakage between casing 254 and housing 256 does not take place. Conduit 264 includes offshoot 268 covered by plug 270. The combination of conduits 262 and 264 provides an internal flowpath for communicating vessel pressure ($P_V$) to transducer 242. Moreover, transducer 240 is in communication with valve pressure chamber 272 as in the other embodiments. A field cover 274 is releasably secured over pilot housing 256 to allow for easy field service and set pressure adjustment.

FIG. 6 further illustrates field testing apparatus 300 which enables field testing of the pilot operated relief valve 16 without opening main valve 122. Field testing apparatus 300 includes pressurized fluid source 302 connected with solenoid valve 304. Extending from solenoid valve 304 to pressure vessel line 146 is conduit 306. Check valve 308 is positioned within pressure vessel line 146 and upstream from the point where conduit 306 connects with line 146.

Solenoid valve 304 electrically communicates with field test system 310 which includes pressure system main frame computer 314.

In use, mainframe computer 314 provides a digital signal which, in turn, triggers an analog or digital signal which triggers an analog or digital low voltage electrical signal that causes solenoid valve 304 to assume an open position. Once solenoid valve 304 assumes an open position, pressurized fluid from source 302 passes through conduit 306 and into line 146 so as to cause check valve 308 to block the portion of line 146 in communication with pressure vessel 82. At the time of field testing, follower 106 is in position A with vent port 114 closed and inlet port 84 open. The pressurized fluid originating from source 302 creates a higher pressure in valve chamber 80 which is detected by transducer 56. Transducer 56 acts to force torsion device 40 in a direction opposite to the initial preset torque. Measurements of the pressure being introduced artificially from source 302 into line 146 and valve chamber 80 are taken at the time the "locked" fluid within pilot 20 is first relieved to the atmosphere via vent port 114. These measurements, taken at the "start-to-vent" point, may be taken by appropriate sensors (not shown) in communication with computer 314.

The start-to-vent pressure of the artificially introduced fluid which is in valve chamber 80 and line 146 provides a good approximation of the "start-to-leak" main valve or pilot operated relief valve set pressure. Accordingly, field testing is made easily and quickly without opening main valve 122. Also, computer 314 can be programmed to make field tests periodically and to activate a warning device (not shown) if start-to-vent pressure is not within a predetermined pressure range.

In lieu of a remote computer 314 and solenoid valve 304 it is possible to rely on a hand operated valve (not shown) in associated with a pressure indicator such as a Bourdon pressure gauge. The hand operated valve is positioned in line with conduit 306 and when opened (e.g. by rotation) fluid enters conduit 146 and places check valve 308 into closed position. Pressurized fluid is introduced into main valve chamber 80 until the artificially introduced pressure is sufficient to cause the fluid within chamber 80 to start-to-vent. The start-to-vent pressure is then read using the pressure gauge which can also be positioned in line with conduit 306.

Discharge of valve chamber 272 is achieved through a vent nozzle (not shown) and conduits extending to an atmospheric opening.

While preferred embodiments of the invention have been shown and described modifications thereof can be made by one skilled in the art without departing from the spirit of the invention.

What is claimed is:

1. A non-flowing modulating pilot device for use in a relief valve system wherein the pilot device controls a piston-covers-nozzle type of main valve connected to a pressure system which is protected by the relief valve system, said pilot device receiving a pressure signal corresponding to the pressure in the pressure system and being operable to control the pressure in a dome pressure chamber of the main valve with the dome pressure biasing the piston in the main valve to regulate flow through the main valve, said pilot device comprising:

a housing which has a controlled pressure chamber and a second pressure chamber;

a torsion device;

said controlled pressure chamber including a vessel pressure inlet port, a venting port and first and second communication ports, said first communication port communicating with the dome pressure chamber of the main valve and said second communication port communicating with the second pressure chamber;

first and second pressure transducers;

said first pressure transducer communicating with the second communication port of the controlled pressure chamber, said first pressure transducer having means for sensing pressure variations in said controlled pressure chamber, and said first pressure transducer being adapted to torque said torsion device in response to the sensed pressure variations;

said second pressure transducer communicating with the pressure system which is protected by the relief valve system, said second pressure transducer having means for sensing pressure variations in the pressure system, and said second pressure transducer being adapted to torque said torsion device in response to the sensed pressure variations in the pressure system.

2. A device as recited in claim 1, wherein said torsion device includes a torsion bar having a central axis and first and second ends, said first end adjustably fixed to said housing, said torsion device including a lever rigidly fixed to said torsion bar and extending on opposite sides of the central axis, said torsion device further including a follower extending on opposite sides of the central axis.

3. A device as recited in claim 2, wherein said lever is adapted to rotate in said second chamber and said follower is adapted to rotate in said pressure chamber.

4. A device as recited in claim 3, wherein said lever includes connecting means at each end which are connected, respectively, to said first and second transducer means.

5. A device as recited in claim 4, wherein said follower includes port covering means at each end for covering said vent and inlet ports when said port covering means are brought into contact with said vent and inlet ports.

6. A device as recited in claim 5, wherein said port covering means includes an elastic pad.

7. A device as recited in claim 6, wherein said port covering means further includes a metal disc secured to one end of said elastic pad.

8. A device as recited in claim 5, wherein said port covering means includes a lapped metal disc and a spring.

9. A device as recited in claim 8, wherein said metal disc and spring are contained within a retainer having one end fixed to said follower and a second end with an inwardly extending flange which traps said disc within said retainer.

10. A device as recited in claim 5, wherein said inlet and vent ports each include a nozzle with a concave end, and said port covering means includes a bearing ball attached at each end to said follower.

11. A device as recited in claim 5, wherein said inlet and vent ports each include a nozzle, and said port covering means includes a conical poppet attached at each end of said follower.

12. A device as recited in claim 5, wherein said inlet and vents ports each include a nozzle, and an O-ring is positioned in a recess formed in the end of each nozzle for contact with said covering means.

13. A device as recited in claim 1, wherein an adjustable vent valve is threadably received within said vent port and said vent valve includes a nozzle extending into said controlled pressure chamber.

14. A device as recited in claim 1, wherein said torsion device includes torsion rods each one secured to a common base and each torsion rod being interconnect with another torsion rod.

15. A device as recited in claim 1, wherein said housing includes two clamping halves, said torsion device including a torsion bar with attachments means formed at one end, said clamping halves each including a clamping surface and clamp adjustments means for varying the position of said clamping surfaces.

16. A pilot device as recited in claim 1, wherein the housing has a top which supports the weight of all acting/moving parts, thus minimizing Couloumb friction if a torsion bar is used.

17. A pilot device as recited in claim 1, having at least one blade which supports the weight of the moving parts to minimize friction if no torsion bar is used.

18. A pilot device as recited in claim 1, having inlet and vent valves within the controlled pressure chamber, and said valves are in one of the following states:
(a) inlet closed, vent closed;
(b) inlet open, vent closed; or
(c) inlet closed, vent open.

19. A pilot operated relief valve having a pilot device as recited in claim 1, said main valve having a dome pressure seal which has a start-to-leak dome pressure while opening which is larger or equal to its stop-to-leak dome pressure while closing.

20. A pilot operated relief valve having a pilot according to claim 1 and exhibiting a proportional characteristic of the dome pressure, main valve lift and discharged mass flow rate with overpressure.

21. A pilot operated relief valve having a pilot according to claim 1 and exhibiting a modulating behavior wherein the main valve opens or closes depending on the size of the vessel pressure derivative with time and thus minimizing losses of discharged product.

22. A pilot operated, relief valve having a pilot device according to claim 1 exhibiting a middle full lift popping action if the vessel pressure increases suddenly.

23. A pilot device according to claim 1 having a utilization pressure setting of at least 3 psig.

24. A pilot device according to claim 1 having a minimum locked fluid mass trapped inside the main valve dome and pilot controlled pressure chamber.

25. A device as recited in claim 1, wherein said second pressure chamber is sealed from said controlled pressure chamber, and said pilot device further comprising fail safe means which includes a vent hole in said second chamber and a rupture device in a common boundary wall of said controlled pressure chamber and second pressure chamber.

26. A pilot device as recited in claim 1, wherein both said inlet port and said second pressure transducer communicate with the pressure system through a piping system.

27. A pilot device as recited in claim 26, wherein said piping system includes a main line, a first branch extending off of said main line and communicating with said inlet port, and a second branch extending off of said main line and communicating with said second pressure transducer.

28. A pilot device as recited in claim 1, wherein said second pressure transducer is adapted to torque said torsion device in tandem with said first pressure transducer.

29. A pilot device as recited in claim 28, wherein said torsion device includes a biased elastic element and the two pressure transducers are arranged such that the torques created by the two transducer oppose the torque produced by said biased elastic element.

* * * * *